April 26, 1932.   J. P. TARBOX ET AL   1,855,460
SELF LOCKING SPOKE END ATTACHMENT
Filed Feb. 12, 1930

INVENTOR.
JOHN P. TARBOX
WARREN H. FARR
BY
ATTORNEY.

Patented Apr. 26, 1932

1,855,460

UNITED STATES PATENT OFFICE

JOHN P. TARBOX, OF PHILADELPHIA, PENNSYLVANIA, AND WARREN H. FARR, OF DETROIT, MICHIGAN, ASSIGNORS TO BUDD WHEEL COMPANY, OF PHILADELPHIA, PENNSYLVANIA, A CORPORATION OF PENNSYLVANIA

SELF-LOCKING SPOKE END ATTACHMENT

Application filed February 12, 1930. Serial No. 427,741.

Our invention relates to a sheet metal wheel and more particularly to the connection of the spoke ends of such wheel to a rim. This connection is an exceedingly difficult one in a steel wheel because of the limited amount of metal in the contacting portions of the spoke and rim and the difficulty of securing an adequate reinforcement at this point.

We have obviated this difficulty by providing an end cap which telescopes into aligned openings in the spoke and rim and is provided with elastic projections for securing these parts together. A simple form of these projections constitutes struck-out portions.

In addition to providing the strong fastening we have obviated the necessity for special fastening devices for the parts and have simplified the operations of securing the spoke ends to the rim.

Figure 2:
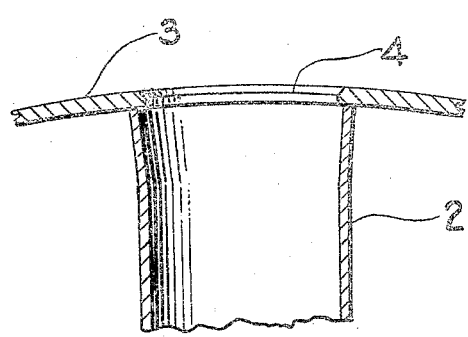
Fig. 2 shows a spoke of such a wheel aligned with an opening in a rim.
Figure 1:
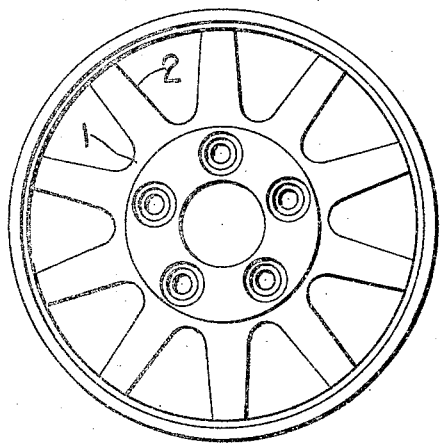
Fig. 1 illustrates an artillery steel wheel.
Figure 3:
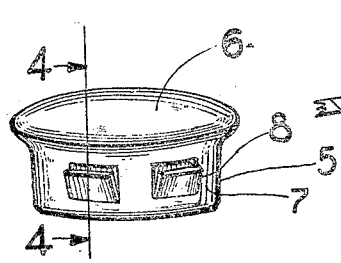
Fig. 3 is a perspective view of an end cap for joining the spoke and rim.
Figure 4:
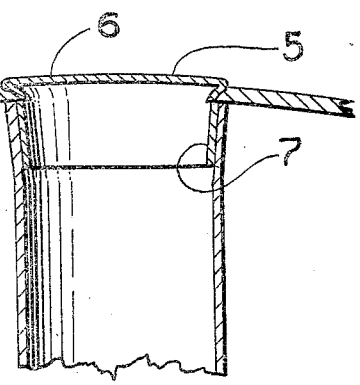
Fig. 4 is a sectional view showing an end cap joining the spoke and rim, the section of the cap being taken along the line 4—4 of Fig. 3.

Referring more specifically to the drawings, the reference character 1 indicates the nave of our wheel and 2 the spokes thereof. 3 indicates the rim having openings 4 aligned with the spokes 2. The ends of these spokes have openings slightly larger than openings 4 provided in the rim and aligned with the ends of the spokes. 5 indicates our improved end cap for joining these parts together. This cap is provided with a top portion 6 and a body portion 7. The body portion 7 has tongues 8 struck out therefrom to provide resilient locking members which spring out behind the edge flange of the hole 4 in the rim when the cap is thrust home, and thus lock these elements together.

Figure 5:
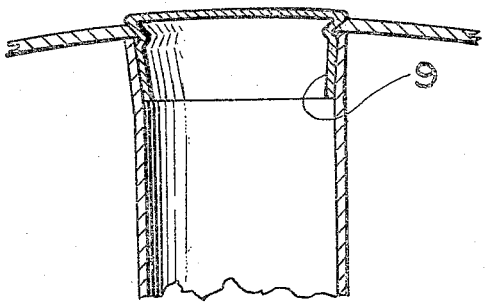
Fig. 5 is a sectional view similar to Fig. 4 showing a modified form of a cap.

In Fig. 5 we have shown a modified form in which the cap is simply outwardly flared in the zone 9 immediately underlying the rim instead of being provided with struck-out tongues. This outwardly flared portion is forced through the smaller opening in the rim. It expands by reason of the inherent elasticity of the steel and locks the cap in place. If desired, the flare 9 may be emphasized after the flared assembly by an internal expanding operation. It may also, if desired, be initially formed by such an operation after the assembly of the parts.

It will be seen that we have provided an end cap which is self-locking in its nature and which affords a secure connection between the parts.

We do not wish to be limited to the exact form of our invention which we have disclosed for illustrative purposes only.

What we claim is:

1. In combination, a rim member having an opening extending through its periphery, a spoke adapted to abut the inner circumference of said rim member and an end cap adapted to be received within said opening and provided with an annular portion adapted to be received within the end of said spoke and a resilient portion adapted to abut against the under side of the rim to secure the spoke thereto.

2. In combination, a rim member having an opening extending through its periphery, a spoke having a hollow portion adjacent its outer end, and an end cap adapted to be received within said opening and provided with a resilient projection adapted to be locked behind the inner edge of said rim.

3. In combination, a rim member having an opening extending through its periphery, a spoke adapted to abut the inner circumference of said rim member, and an end cap adapted to be received within said opening and provided with an annular portion adapted to be received within the end of said spoke, said end cap being further provided with a plurality of upwardly extending tongues adapted to snap behind the inside edge of the rim to secure the spoke thereto.

In testimony whereof we hereunto affix our signatures.

JOHN P. TARBOX.
WARREN H. FARR.